United States Patent
Kousaka et al.

(10) Patent No.: US 8,153,229 B2
(45) Date of Patent: Apr. 10, 2012

(54) EPOXY RESIN COMPOSITION FOR FIBER-REINFORCED COMPOSITE MATERIAL

(75) Inventors: Takashi Kousaka, Hiratsuka (JP); Mitsuhiro Iwata, Hiratsuka (JP); Tomohiro Ito, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 244 days.

(21) Appl. No.: 12/298,049

(22) PCT Filed: Apr. 24, 2007

(86) PCT No.: PCT/JP2007/058882
§ 371 (c)(1), (2), (4) Date: Oct. 22, 2008

(87) PCT Pub. No.: WO2007/125929
PCT Pub. Date: Nov. 8, 2007

(65) Prior Publication Data
US 2009/0130379 A1  May 21, 2009

(30) Foreign Application Priority Data

Apr. 25, 2006 (JP) ................. 2006-120704
Apr. 25, 2006 (JP) ................. 2006-120706
Apr. 25, 2006 (JP) ................. 2006-120707

(51) Int. Cl.
*B32B 3/12* (2006.01)

(52) U.S. Cl. ............ 428/117; 428/320.2; 428/368; 428/372; 428/394; 428/369; 428/408; 428/539.5; 524/105; 524/167; 524/170; 524/284; 524/266; 524/538; 524/612; 525/403; 525/409; 525/430; 525/436; 525/535

(58) Field of Classification Search ............. 525/403, 525/409, 430, 436, 535; 428/117, 320.2, 428/368, 372, 394, 396, 408, 539.5; 524/105, 524/167, 170, 284, 366, 538, 612
See application file for complete search history.

(56) References Cited

U.S. PATENT DOCUMENTS

| | | | | |
|---|---|---|---|---|
| 2,847,395 A * | 8/1958 | Wear | ............. | 428/414 |
| 5,589,523 A * | 12/1996 | Sawaoka et al. | ............. | 523/211 |
| 6,596,373 B1 * | 7/2003 | Kishi et al. | ............. | 428/116 |
| 6,838,176 B2 * | 1/2005 | Goto et al. | ............. | 428/413 |
| 2007/0104960 A1 * | 5/2007 | Asano et al. | ............. | 428/413 |

FOREIGN PATENT DOCUMENTS

| | | |
|---|---|---|
| JP | 2003026768 | 1/2003 |
| JP | 2004075914 | 3/2004 |
| JP | 2004269600 | 9/2004 |

OTHER PUBLICATIONS

Kyowa Hakko Chemical Co., Adipic Dihydrazide technical data sheet [online], accessed via the Internet [retrieved on Aug. 18, 2010], URL: <http://www.kyowachemical.co.jp>.*

* cited by examiner

*Primary Examiner* — David W Wu
*Assistant Examiner* — Robert Jones, Jr.
(74) *Attorney, Agent, or Firm* — Connolly Bove Lodge & Hutz LLP

(57) ABSTRACT

Provided is an epoxy resin composition for fiber-reinforced composite materials, which serves as a matrix resin for a prepreg. This epoxy resin composition is improved in tackiness stability during storage, while maintaining mechanical characteristics. The epoxy resin composition for fiber-reinforced composite materials is characterized by containing 25 to 50 parts by weight of an amine curing agent (B) selected from aliphatic polyamines, alicyclic polyamines and aromatic polyamines, and 1 to 20 parts by weight of an organic acid dihydrazide compound (C) having a melting point of not less than 150° C., per 100 parts by weight of an epoxy resin (A).

15 Claims, No Drawings

EPOXY RESIN COMPOSITION FOR FIBER-REINFORCED COMPOSITE MATERIAL

This application is a National Stage of PCT/JP2007/058882 filed Apr. 24, 2007 which in turn claims priority from Japanese Application 2006-12704 filed Apr. 25, 2006, Japanese Application 2006-120706 filed Apr. 25, 2006 and Japanese Application 2006-12707 filed Apr. 25, 2006, the entire contents of which are incorporated herein by reference.

TECHNICAL FIELD

The present invention relates to an epoxy resin composition for fiber-reinforced composite materials. More specifically, the present invention relates to an epoxy resin composition suitable as a matrix resin for a self-adhesive prepreg for a face sheet of a honeycomb panel.

BACKGROUND ART

Fiber-reinforced composite materials having an epoxy resin composition as a matrix resin are widely used for aircrafts, automobiles and industrial applications due to their excellent mechanical properties and the like. In particular, in structural materials and interior materials for aircrafts, from the viewpoint of weight reduction, use of fiber-reinforced composite materials as face sheets of honeycomb panels is increasing. As the matrix resin, a resin composition primarily including an epoxy resin and an amine curing agent is frequently used, and its cured material exhibits high toughness and provides the characteristic of a high heat deformation temperature. However, as applications of composite materials are broadened, needs for the exhibition of higher mechanical characteristics are greatly increasing.

As one measure for the needs, Patent Document 1 proposes that dicyandiamide be added into an epoxy resin composition as a curing agent to thereby improve interlaminar shear strength and flexural strength. However, if dicyandiamide is used, it easily dissolves in an epoxy resin in a temperature raising process, increasing its reactivity with the epoxy resin, and thus tends to promote curing reaction with the epoxy resin due to temperature increase during resin film production or prepreg impregnation, thereby posing the problem of continuously increasing the viscosity of the resin composition. In addition, curing reaction proceeds during the storage of the prepreg in a working environment, causing the problem that tackiness and drapability of the prepreg are likely to decrease.

On the other hand, demanded is a self-adhesion technique for directly bonding a prepreg of fiber-reinforced composite materials to a honeycomb core without use of a film adhesive in order to make the honeycomb panel further light weighted and to reduce molding cost.

However, the self-adhesive strength of a prepreg needs to be improved by a matrix resin in order to eliminate the need of a film adhesive, and, in order to improve the self-adhesive strength, it is important to obtain a fillet having a favorable shape and strength, which is formed in the bonding surface between a honeycomb core and a prepreg. The strength of a fillet depends on the toughness of the cured material of a matrix resin and the shape of a fillet is closely related to the viscosity of a matrix resin in heat curing; the higher the minimum viscosity, the better the shape of a fillet to be obtained. In other words, if the toughness of a cured resin material and the resin viscosity in heat curing are not appropriate, sufficient adhesive strength caused by a fillet is not obtained.

In addition, prior to heat curing of a prepreg, the viscosity of a matrix resin is preferably low. This is because if the resin viscosity is low in a normal temperature region in which a prepreg is treated, tackiness and drapability can be keep good. This is also because, in a step of fabricating a resin film prior to prepreg impregnation, if the resin viscosity is low in the temperature range of roughly from 60 to 90° C., the production efficiency of a prepreg can be improved.

Patent Document 2 describes that, when the prepreg is directly bonded to a honeycomb core, the use of dicyandiamide along with an amine curing agent as a curing agent for an epoxy resin composition to be a matrix resin of a prepreg enables the formation of a good strength fillet, thereby improving adhesion strength. However, when dicyandiamide is used in combination with an amine curing agent in this manner, the reaction activity of dicyandiamide with an epoxy resin is increased as described above, and therefore the dicyandiamide is prone to cause curing reaction with the epoxy resin even by a slight temperature increase. For example, the resin viscosity continuously increases during resin film fabrication, thereby causing the problem of lowering the production efficiency of a prepreg. Additionally, during the storage of a prepreg in a working environment its curing reaction proceeds, causing the problem that tackiness and drapability of the prepreg are likely to decrease. In addition, although this matrix resin improves the toughness of the cured resin material to some extent, the resin is still insufficient to improve toughness for improving the strength of a fillet formed when a honeycomb is directly bonded to a prepreg. For this reason, this resin is insufficient in mechanical properties.

Patent Document 1: Japanese patent application Kokai publication No. Hei 2-51538
Patent Document 2: Japanese patent application Kokai publication No. Sho 58-83022

DISCLOSURE OF THE INVENTION

Problems to be Solved by the Invention

An object of the present invention is to provide an epoxy resin composition for fiber-reinforced composite materials, the epoxy resin composition serving as a matrix resin for a prepreg with improved tackiness stability during storage, and its mechanical properties being maintained. Another object of the present invention is to provide an epoxy resin composition for fiber-reinforced composite materials that is made improved in self-adhesive strength and also productivity of a prepreg as well as storage stability.

Means for Solving the Problems

An epoxy resin composition for fiber-reinforced composite materials of the present invention which achieves the above object comprises: 100 parts by weight of an epoxy resin (A); 25 to 50 parts by weight of an amine curing agent (B) selected from aliphatic polyamines, alicyclic polyamines and aromatic polyamines; and 1 to 20 parts by weight of an organic acid dihydrazide compound (C) of a melting point of 150° C. or higher.

The above epoxy resin composition may preferably include dicyandiamide (D) and also may preferably include the above organic acid dihydrazide compound (C) dispersed in a particulate form.

In addition, the above epoxy resin composition may preferably include a thermosetting resin (E), which is solid at normal temperature and this thermosetting resin (E) may be preferably dispersed in a particulate form.

Effects of the Invention

In the epoxy resin composition for fiber-reinforced composite materials of the present invention, the organic acid dihydrazide compound (C) with a melting point of 150° C. or higher is added, in place of dicyandiamide, to the epoxy resin (A) and the amine curing agent (B). Since, the organic acid dihydrazide compound (C) is hard to dissolve in the epoxy resin in a temperature increasing step, the curing reaction with the epoxy resin does not occur. Therefore, the viscosity stability of the epoxy resin composition is high, enabling the tackiness and drapability of a prepreg made thereof to be well kept at normal temperature for a long period. In addition, the mechanical properties of the cured resin material can be at the same level as that made with dicyandiamide.

Additionally, the organic acid dihydrazide compound (C) has a melting point of 150° C. or higher, which is higher than those of dicyandiamide (D) and the amine curing agent (B), and is dispersed in an undissolved particulate form. Therefore, even when dicyandiamide (D) is used together, the curing reaction of dicyandiamide (D) with the epoxy resin (A) prior to heat curing is inhibited, thereby improving the productivity of resin film fabrication before prepreg impregnation and storage stability of a prepreg at normal temperature.

On the other hand, when heat is applied at high temperature at heat curing of a prepreg, the organic acid dihydrazide compound (C) dissolves and the amine curing agent (B) and dicyandiamide (D) start curing reaction with the epoxy resin (A), thereby increasing the minimum viscosity of the resin, being capable of obtaining a fillet of a good shape and improving the toughness of the cured resin material. Because of this, use thereof in a matrix resin in a prepreg makes it possible to improve the self-adhesive strength of the prepreg.

BEST MODES FOR CARRYING OUT THE INVENTION

In the epoxy resin composition for fiber-reinforced composite materials of the present invention, the epoxy resin (A) is not particularly limited and the examples that can be used include: glycidyl ether-type epoxy resins; glycidyl ester-type epoxy resins; glycidyl amine-type epoxy resins; and the like and the examples that may be used include urethane-modified epoxy resins, rubber-modified epoxy resins, alkyd-modified epoxy resins and the like. Of these, glycidyl ester-type epoxy resins or glycidyl amine-type epoxy resins is preferred. The number of functional groups of the epoxy resin is not particularly limited and is preferably from 2 to 5, more preferably from 2 to 3.

These epoxy resins preferably include: specifically as glycidyl ether-type epoxy resins, bisphenol A-type epoxy resins bisphenol F-type epoxy resins; bisphenol S-type epoxy resins; phenol novolac-type epoxy resins; cresol novolac-type epoxy resins; resorcinol-type epoxy resins; and the like and, as glycidyl amine-type epoxy resins, tetraglycidyl diaminodiphenylmethane, triglycidyl-p-aminophenol, triglycidyl aminocresol, tetraglycidyl diaminodiphenylmethane resins, tetraglycidyl m-xylylene amine resins, N,N-diaminocresol resins and other various modified epoxy resins and crystalline epoxy resins and the like. Use of these epoxy resins alone or in combination of two or more species enables the adjustment of tackiness and drapability of a prepreg while ensuring mechanical characteristics such as toughness and heat resistance required by matrix resins.

The amine curing agent (B) is selected from aliphatic polyamines, alicyclic polyamines and aromatic polyamines, and may be preferably an aromatic polyamine. The aromatic polyamines preferably include: diaminodiphenylsulfones; diaminodiphenylmethanes; meta-xylenediamine; meta-phenylenediamine; and the like, and particularly diaminodiphenylsulfones are preferred from the viewpoint of improving heat resistance of a cured material. Of these, 3,3'-diaminodiphenylsulfone and 4,4'-diaminodiphenylsulfone are particularly preferred. These amine curing agents (B) can also be used in combination of two or more species.

The amount of the amine curing agent (B) blended may be from 25 to 50 parts by weight, preferably from 30 to 45 parts by weight, based on 100 parts by weight of the epoxy resin (A). Rendering the amount of the amine curing agent (B) blended within the ranges makes it possible to sufficiently secure mechanical properties of cured resin materials, particularly physical properties such as strength, toughness and heat resistance.

The epoxy resin composition of the present invention is produced by blending the epoxy resin (A) and the amine curing agent (B) and further the organic acid dihydrazide compound (C) serving as an active hydrogen-type latent curing agent in a particulate form. The organic acid dihydrazide compound (C) that may be used include a compound with a melting point of 150° C. or higher, preferably with a melting point of from 160° C. to 200° C. Making the melting point 150° C. or higher enables excellent thermal stability and the restraint of progress of curing reaction thereof with an epoxy resin during coating operation conducted at a resin temperature of from 60 to 90° C. or during storage at normal temperature. In other words, even if the epoxy resin composition is left at a resin temperature of from 60 to 90° C. during coating operation for a long period of time, an increase in resin viscosity can be suppressed. For example, even if the epoxy resin is placed in a feeding tank or a resin dam of a coater roll at a resin temperature of from 60 to 90° C. for 1 to 2 hours, the increase of the resin viscosity is restrained low during the time and discharge thereof from the feeding tank is made easy and also a resin film can be fabricated without altering running conditions of the coater roll.

The organic acid dihydrazide compound has a high melting point of 150° C. or higher, and thus is difficult to dissolve in the epoxy resin at low temperature. For this reason, the organic acid dihydrazide compound in a particulate form is preferably used. The use of the particulate organic acid dihydrazide compound renders it easier to raise temperature in heat curing, and such dihydrazide compound can be easily dissolved in the epoxy resin when it reaches a predetermined temperature, and thus is capable of proceeding curing reaction. The average particle diameter of the organic acid dihydrazide compound (C) particle may be preferably 100 μm or smaller, more preferably from 5 to 50 μm. The average particle diameter is preferably 100 μm or smaller, because the organic acid dihydrazide compound (C) with such average particle diameter facilitates the temperature rise in heat curing, and easily dissolves in the epoxy resin when the temperature reaches a predetermined temperature. Particles with an average particle diameter of 100 μm or smaller can be obtained as appropriate from commercial products. Moreover, for the obtainment of fine particles, they are preferably made smaller by an impact grinding method or a spray drying method. In addition, an "average particle diameter" in the present invention refers to a value obtained by measuring particle diameters and the frequency distribution of particles after grinding and then calculating the weight average value from them.

The organic acid dihydrazide compound (C) is preferably a carboxylic acid dihydrazide compound or a dibasic acid dihydrazide compound, more preferably a carboxylic acid dihydrazide compound. The carboxylic acid dihydrazide compound may preferably be a compound expressed by Formula (I) below:

wherein X represents a phenyl group or an aliphatic hydrocarbon group having 2 to 18 carbon atoms. An aliphatic hydrocarbon group is a group made of a saturated hydrocarbon or an unsaturated hydrocarbon and may be in the form of any of a straight chain, a branched chain and an alicyclic chain.

Such organic acid dihydrazide compounds that can be preferred include: adipic acid dihydrazide; succinic acid dihydrazide, sebacic acid dihydrazide, dodecanedioic acid dihydrazide, octadecadiene-dicarbohydrazides, and the like.

Of these, the organic acid dihydrazide compound (C) is preferably a carboxylic acid dihydrazide compound expressed by Formula (II) below.

The organic acid dihydrazide compound (C) may be blended in an amount of 1 to 20 parts by weight, preferably 3 to 10 parts by weight, based on 100 parts by weight of the epoxy resin (A). Making the amount of blending 1 part by weight or more renders it possible to obtain the effect of improving mechanical properties of a cured resin material. Making the amount of blending 20 parts by weight or less renders it possible to certainly dissolve the organic acid dihydrazide compound (C) in an epoxy resin in heat curing. This renders it possible to properly adjust the minimum viscosity in heat curing.

Even when dicyandiamide is not used for the epoxy resin composition of the present invention, an equivalent-level excellent mechanical properties can be obtained without impairing mechanical properties, particularly toughness and heat resistance, of a resulting cured resin material because the organic acid dihydrazide compound (C), which is an active hydrogen-type latent curing agent, is used. Thus, when the composition is used as a matrix resin for a prepreg, it is possible to increase the strength of a fillet and to improve the adhesive strength thereof with a honeycomb core.

The epoxy resin composition for fiber-reinforced composite materials of the present invention essentially has the above components (A) to (C) and can further include dicyandiamide (D) within a range not impairing the effects of the present invention.

Dicyandiamide (D) has high reaction activity and is excellent in physical properties after cured and thus is suitably used as a curing agent of an epoxy resin composition for a prepreg. However, the compound is easily subjected to curing reaction with an epoxy resin composition prior to implementation of heat curing, whereby coexistence with particles of the organic acid dihydrazide compound (C) enables curing reaction prior to heating to be inhibited.

The organic acid dihydrazide compound (C) with a melting point of 150° C. or higher has the excellent property of inhibiting curing reaction of the epoxy resin (A) with dicyandiamide (D) prior to heat curing. Therefore, the dihydrazide compound can restrain the progress of curing reaction of dicyandiamide (D) prior to heat curing, and thereby can restrain an increase in resin viscosity and a decrease in tackiness when a prepreg is stored at normal temperature. For instance, even where dicyandiamide (D) coexists, the compound can inhibit an increase in resin viscosity even if the resin composition is exposed to a resin temperature of 60 to 90° C. during coating operation for a long time and can make easy the discharge of the resin composition from a feeding tank and allow a resin film to be fabricated without greatly changing the operation conditions of a coater roll even if the material is placed in the feeding tank or a resin tank of the coater roll for 1 to 2 hours.

Dicyandiamide (D) may preferably be blended in an amount of from 1 to 5 parts by weight, more preferably from 1 to 3 parts by weight, based on 100 parts by weight of the epoxy resin (A). Making the amount of blending of dicyandiamide (D) 1 part by weight or more sufficiently provides the effect of improvement of mechanical properties of a cured resin material; making the amount 5 parts by weight or less allows the curing reaction prior to heat curing to hardly take place.

In addition, when the epoxy resin composition is heated in heat curing, and the organic acid dihydrazide compound (C) starts to dissolve, the amine curing agent (B) and dicyandiamide (D) start curing reaction with the epoxy resin (A), thereby increasing the minimum viscosity of the resin composition during heat curing. As a result, a good shape of a fillet can be obtained and also the toughness of the cured resin material can be improved.

The epoxy resin composition of the present invention may include the thermosetting resin (E), which is solid at normal temperature, and this thermosetting resin (E) may be dispersed in a particulate form. Particles of the thermosetting resin (E) that is solid at normal temperature are made not to completely dissolve in the epoxy resin (A) unless reaching a predetermined temperature. When a predetermined temperature is reached, particles of the thermosetting resin (E) dissolve uniformly. Thus the viscosity of the epoxy resin composition is properly adjusted, enabling to form a good fillet.

Additionally, the addition of particles of the thermosetting resin (E), even when a thermoplastic resin (F) described below is blended, enables its amount of blending to be reduced, and therefore the viscosity of the resin composition prior to the heat curing step can be decreased to improve tackiness and drapability of a prepreg, thereby being capable of obtaining excellent workability. Furthermore, the case where particles of the thermosetting resin (E) are added is excellent in the effect of improving the toughness of the epoxy resin composition as compared with the case where only particles of a thermoplastic resin are blended so as not to dissolve, whereby the strength of a fillet can be improved and adhesive strength thereof with a honeycomb core can be further increased to improve self-adhesiveness.

Particles of the thermosetting resin (E) that is solid at normal temperature do not completely dissolve in the epoxy resin (A) at a temperature of preferably less than 90° C., or more preferably from 60° C. to 90° C. And a softening point of the thermosetting resin (E) may be preferably 120° C. or higher, more preferably from 130° C. to 160° C. In addition, the softening point is a value measured in accordance with JIS K-7234.

In the present invention, the kind of particles of the thermosetting resin (E) is not particularly limited. However, the examples that are preferred include: epoxy resins; bismaleimide resins; isocyanate resins; phenol resins unsaturated polyester resins; and vinyl ester resins, that are solid at normal temperature, and the examples that are particularly preferred include: epoxy resins; bismaleimide-type resins; and isocyanate-type resins, that are solid at normal temperature. An epoxy resin that is solid at normal temperature can be prepared, for example, by purifying bisphenol A-type epoxy resin to increase purity and also increasing its molecular weight. A crystalline solid at normal temperature is obtained. The epoxy resin is preferable because workability of a prepreg is improved due to the high softening point and because the epoxy resin has the effect of improving the porosity.

Furthermore, particles of the thermosetting resin (E) may preferably have a particle diameter of 100 μm or less, more preferably from 5 to 50 μm. When the particle diameters of particles of the thermosetting resin (E) are made within such ranges, the particles uniformly dissolves when reaching a predetermined temperature at the heat curing step, so that the viscosity of the epoxy resin composition can be appropriately controlled. In addition, the method of preparing particles of the thermosetting resin (E) and the method of measuring particle diameters include grinding preparation and measurement as in the case of particles of the organic acid dihydrazide compound (C) described above.

The epoxy resin composition of the present invention may preferably include 2 to 20 parts by weight of the thermosetting resin (E), more preferably from 5 to 15 parts by weight, in the blending ratio, based on 100 parts by weight of the epoxy resin (A). The amount of blending of the thermosetting resin (E) is preferably 2 parts by weight or more, because the viscosity of the epoxy resin composition can be appropriately controlled to obtain the effect of improving the toughness of the cured resin material. In addition, the amount of blending is preferably made to be 20 parts by weight or less, because the prepreg can be made to have appropriate hardness to improve tackiness and drapability.

The epoxy resin composition of the present invention may also include the thermoplastic resin (F). This is because the thermoplastic resin (F) is dissolved in the epoxy resin (A) to thereby control the viscosity of the epoxy resin composition and increase the minimum viscosity of the resin composition at heat curing, and thus a good shaped fillet can be formed as well as toughness of a cured resin material can be improved. Because of this, the thermoplastic resin (F) may be dissolved in the epoxy resin (A) preferably at a temperature of 90° C. or higher, more preferably at a temperature of from 95° C. to 150° C. When the resin is dissolved in such temperature ranges, it can be easily and uniformly dissolved and stirred and mixed.

The kind of the thermoplastic resin (F) is not particularly limited and preferably includes at least one kind selected from polyethersulfone resins, polyetherimide resins, polyimide resins, polyamide resins, polyether resins, polyester resins, polysulfone resins, polyamideimide resins, polyacrylate resins, polyarylether resins, polyphenylether resins and polyetheretherketone resins. The thermoplastic resin (F) is particularly preferably polyethersulfone resins or polyetherimide resins, which has high compatibility with or affinity for the epoxy resin component as compared with other thermoplastic resins, thereby having the greater effect of improving the toughness of the cured resin material.

The thermoplastic resin (F) preferably is a particulate material and its particle diameter may be preferably 200 μm or smaller, more preferably from 5 to 100 μm. The use of a fine particulate thermoplastic resin having such particle diameters makes it possible to improve the viscosity characteristics and toughness of the resin composition since the particles are dissolved rapidly and uniformly while avoiding having large particles left undissolved when added to the epoxy resin. In other words, when the particle diameter of the particulates is made to be 200 μm or smaller, the thermoplastic resin (F) uniformly dissolves in the epoxy resin (A) to obtain the effect of improving the physical properties, particularly the toughness of the resin composition. The method of preparing particles of the thermoplastic resin (F) and the method of measuring particle diameters thereof include grinding preparation and measurement as in the case of particles of the organic acid dihydrazide compound (C) described above.

The epoxy resin composition of the present invention may preferably include 20 to 60 parts by weight of the thermoplastic resin (F), more preferably from 30 to 50 parts by weight, in the blending ratio, based on 100 parts by weight of the epoxy resin (A). When the amount of blending of the thermoplastic resin (F) is made to be within the range of from 20 to 60 parts by weight, the viscosity of the epoxy resin composition can be appropriately controlled and when the amount of blending is made to be 60 parts by weight or less, the tackiness and drapability can be improved.

The epoxy resin composition for fiber-reinforced composite materials of the present invention essentially includes the above (A) to (C) components and arbitrarily includes blending of the (D) to (F) components, and may include, as required in addition to the above (A) to (F) components, blending of a variety of additives such as a well-known curing agent, particles of thermosetting resin, viscosity adjusting agent, filler, stabilizer, fire retardant and pigment, within a range not impairing the effects of the present invention.

In the epoxy resin composition of the present invention, the minimum viscosity, which is measured in dynamic viscoelasticity measurement at a temperature rise rate of 2° C./minute, may be preferably from 10 to 150 Pa·s, more preferably from 20 to 150 Pa·s. Rendering the minimum viscosity measured in dynamic viscoelasticity measurement within the above ranges is important for improving productivity of a prepreg and self-adhesiveness thereof. When the minimum viscosity is made to be 10 Pa·s or larger, a good fillet can be formed to thereby improve self-adhesiveness, and when the minimum viscosity is made to be 150 Pa·s or lower, the resin composition can be readily impregnated into reinforcing fiber during prepreg production while maintaining formability of a fillet. It should be noted that, in the present invention, the minimum viscosity in dynamic viscoelasticity measurement refers to a minimum value of complex viscosity in dynamic viscoelasticity measurement at a temperature in a range from 25° C. to 200° C. at a temperature rise rate of 2° C./minute at a frequency of 10 rad/second at a strain of 1%.

In the epoxy resin composition of the present invention the fracture toughness value of a cured resin material refers to a fracture toughness value measured in accordance with ASTM D5045-91 and may be preferably 1.8 MPa·$\sqrt{m}$ or higher, more preferably 1.8 to 2.5 MPa·$\sqrt{m}$. When the fracture toughness value of a cured resin material is 1.8 MPa·$\sqrt{m}$ or higher, toughness of a fillet part is high, and the peeling strength can be so improved that material fracture starts to occur in a part of a honeycomb core in a peeling test after bonding of a face sheet (prepreg) and the honeycomb core.

In addition, even though the epoxy resin composition of the present invention is placed at a resin temperature of from 60 to 90° C. for a long time during coating operation of producing a resin film, the resin composition has the feature of the small change in resin viscosity. For example, the amount of change in viscosity when the resin composition is placed at a resin temperature of 75° C. for 2 hours may be preferably 150 Pa·s or smaller, more preferably 100 Pa·s or smaller, still more preferably 70 Pa·s or smaller, particularly preferably 55 Pa·s or smaller. When the amount of change in viscosity is 150 Pa·s or smaller, the change in resin viscosity is small even when the resin composition is left in a feeding tank or in a resin dam of a coater roll for a long time, whereby the subsequent discharge of it from the feeding tank can be made easier and a resin film can be fabricated without greatly altering running conditions of the coater roll. Note that, regarding the change in viscosity, the amount of change in viscosity is obtained by measuring the change in complex viscosity with time in dynamic viscoelasticity measurement at a constant temperature of 75° C. at a frequency of 10 rad/second at a strain of 1%.

Additionally, during heat curing, the epoxy resin composition of the present invention has a high reaction starting temperature, preferably 100° C. or higher, more preferably from 110 to 145° C. Thus the epoxy resin composition of the present invention is excellent in heat stability prior to heat curing to thereby be capable of restraining an increase in resin viscosity due to the curing reaction. Specifically, the reaction starting temperature measured by differential scanning calorimetry (DSC) is high, thereby being able to inhibit the progress of curing reaction at a resin temperature (60 to 90° C.) during usual coating operation or at normal temperature during storage. In addition, the reaction starting temperature in heat curing refers to a reaction starting temperature measured by differential scanning calorimetry (DSC) at a temperature rise rate of 10° C./min, that is, an intersection of a extended line of a rising of an exothermic peak and a base line.

The method of producing an epoxy resin composition for fiber-reinforced composite material of the present invention is not particularly limited and the epoxy resin (A) is mixed and stirred preferably at a temperature of from 95 to 150° C., more preferably at a temperature of from 100 to 125° C. to make a resin solution. At this time, if the thermoplastic resin (F) is blended, the thermoplastic resin (F) is preferably added and dissolved to prepare a mixture resin. Thereafter, the mixture resin is preferably cooled to a temperature of from 60 to 90° C., more preferably to a temperature of from 70 to 80° C., and then to this mixture resin are added other blend components including the amine curing agent (B) and the organic acid dihydrazide compound (C). Specifically, the amine curing agent (B) and the organic acid dihydrazide compound (C) and, as required, dicyandiamide (D) and/or particles of the thermosetting resin (E) are added thereto and uniformly dispersed to produce the resin composition.

Specifically, the epoxy resin (A) and preferably the thermoplastic resin (F) may be mixed and stirred for about 0.5 to 3 hours until certainly uniformly dissolved by means of a planetary mixer set at a temperature of from 95 to 150° C. Then, it is preferred that this mixture resin is cooled to a temperature of from 60 to 90° C. and the amine curing agent (B) and the organic acid dihydrazide compound (C) and, as required, dicyandiamide (D) and/or particles of the thermosetting resin (E) are added thereto and uniformly dispersed and blended to produce the resin composition.

A fiber-reinforced prepreg of the present invention is produced by using the above-described epoxy resin composition for the fiber-reinforced composite materials as a matrix resin, and by compounding the matrix resin with the reinforcing fiber. Preferable reinforcing fibers are: carbon fibers; graphite fibers; aramid fibers; glass fibers; and the like. Of these, carbon fibers are preferred and carbon fiber fabrics are particularly preferred.

In the fiber-reinforced prepreg, the percent content of matrix resin may be preferably from 30 to 50% by weight, more preferably from 35 to 45% by weight. If the proportion of the matrix resin in the fiber-reinforced prepreg is within the ranges, the self-adhesiveness of the prepreg is improved and also workability and appearance quality are improved and further the mechanical properties of a carbon fiber-reinforced composite materials can be fully exhibited.

The method of producing a fiber-reinforced prepreg is preferably a hot melt method that involves coating an epoxy resin composition of the present invention onto an exfoliate paper in a thin film form to fabricate a resin film, laminating the resin film above and below the reinforcing fiber and then heating and pressing them to thereby impregnate the epoxy resin composition into the reinforcing fiber. A prepreg obtained in this manner is excellent in storage stability even though placed in a working environment or in a normal temperature atmosphere for a long period of time and does not deteriorate in tackiness and drapability.

Specifically, the fiber-reinforced prepreg of the present invention has not blended therein dicyandiamide or has blended therein it in a small amount and has blended therein the organic acid dihydrazide compound (C) with a melting point of 150° C. or higher, whereby the resulting material is excellent in storage stability at normal temperature. In other words, when the material is stored at normal temperature for a long period of time, an increase in viscosity of the matrix resin is small, and thus the tackiness of the prepreg is hardly changed. Here, normal temperature refers to a temperature at which a prepreg is treated in a working environment and is about from 10 to 35° C. The epoxy resin composition of the present invention does not deteriorate in tackiness even though it is left to stand, for example, preferably for ten days at a room temperature of 20° C., and maintains the excellent tackiness exhibited immediately after the fabrication of the prepreg.

The fiber-reinforced prepreg obtained in this manner is laminated on both faces of a honeycomb core and then subjected to heat curing molding such as usual auto clave molding or hot-press molding to be able to produce fiber-reinforced composite materials. The resulting fiber-reinforced composite material has a good fillet and high adhesive strength as well as excellent mechanical performance.

A honeycomb core used in the present invention may preferably be any one selected from aramid honeycombs, aluminum honeycombs, paper honeycombs and glass honeycombs. Of these, aramid honeycombs are preferred.

Hereinafter, the present invention will be further described by way of Examples; however, the scope of the invention is by no means limited to these Examples.

EXAMPLES

Examples 1 to 6 and Comparative Examples 1 to 4

The epoxy resin (A), the amine curing agent (B), the organic acid dihydrazide compound (C) and, as an arbitrary components, dicyandiamide (D), the thermosetting resin (E) and the thermoplastic resin (F), which are listed below, were used to prepare epoxy resin compositions in blend ratios listed each in Tables 1 and 2. First, the total amounts of epoxy resin (A) and thermoplastic resin (F) were stirred and mixed for 75 minutes by means of a planetary mixer set at a temperature of 125° C. until they became a uniform resin solution. Thereafter, this planetary mixer was set at a temperature of 70° C., and when the resin temperature became uniform, the total amounts of the amine curing agent (B), the organic acid dihydrazide compound (C), dicyandiamide (D) and the particles of the thermosetting resin (E) were added to this resin solution, and then the resulting material was stirred and mixed to prepare an epoxy resin composition.

Epoxy Resins (A)

Resin A-1: N,N,O-triglycidyl-p-aminophenol resin (MY-0510 manufactured by Huntsman Advanced Materials LLC)

Resin A-2: bisphenol F-type epoxy resin (Epicoat-806 manufactured by Japan Epoxy Resins Co., Ltd.)

Amine Curing Agent (B)

Curing agent B: 3,3'-diaminodiphenylsulfone (ARA-DUR9719-1 manufactured by Huntsman Advanced Materials LLC)

Dicyandiamide (D)

Curing agent D: dicyandiamide (Epicure DICY 15 manufactured by Japan Epoxy Resins Co., Ltd.)

Organic acid Dihydrazide Compounds (C)

Curing agent C-1: adipic acid dihydrazide compound (ADH manufactured by Japan Finechem Co., Inc.), melting point: 177 to 184° C., average particle diameter: 13 μm Curing agent C-2: dodecanedioic acid dihydrazide (N-12 manufactured by Japan Finechem Co., Inc.), melting point: 185 to 190° C., average particle diameter: 9 μm Curing agent C-3: sebacic acid dihydrazide compound (SDH manufactured by Japan Finechem Co., Inc.), melting point: 185 to 189° C., average particle diameter: 21 μm Curing agent C-4: 1,3-bis(hydrazinocarbonoethyl)-5-isopropylhydantoin (VDH manufactured by Ajinomoto Fine-Techno Co., Inc.), melting point: 118 to 124° C., average particle diameter: 10 μm Curing agent C-5: 7,11-octadecadiene-1,18-dicarbohydrazide (UDH manufactured by Ajinomoto Fine-Techno Co., Inc.), melting point: 150 to 165° C., average particle diameter: 20 μm Thermosetting Resin (E)

Resin E: bisphenol A-type epoxy resin (YD-020N manufactured by Tohto Kasei Co., Ltd.), softening point: 135° C. to 150° C., prepared as fine particles having a particle diameter of 100 μm or less by impact grinding Thermoplastic Resin (F)

Resin F: polyethersulfone resin (Sumikaexcel PES5003P manufactured by Sumitomo Chemical Co., Ltd.), prepared as fine particles having a particle diameter of 100 μm or less by impact grinding For 10 kinds of epoxy resin compositions obtained (Examples 1 to 6, Comparative Examples 1 to 4), the amounts of change in viscosity, the reaction starting temperatures, tackiness of the epoxy resin compositions and fracture toughness values of the cured materials were evaluated by means of methods indicated below, with the results listed in Tables 1 and 2. In addition, of these, 5 kinds of epoxy resin compositions (Examples 4 to 6, Comparative Examples and 4) were each evaluated for the minimum viscosities in heat curing of the epoxy resin compositions, tackiness of prepregs and peel strengths of the honeycomb panels by means of the methods indicated below, with the measurement results listed in Table 2.

[Amount of Change in Viscosity of Epoxy Resin Composition]

The change in viscosity with time of the epoxy resin composition at a temperature of 75° C. was measured for 2 hours to determine the amount of change in viscosity in 2 hours relative to an initial viscosity. Note that, regarding the viscosity of the epoxy resin composition, the complex viscosity was measured in dynamic viscoelasticity measurement with a strain of 1% at a constant temperature of 75° C. at a frequency of 10 rad/second.

[Reaction Starting Temperature of Epoxy Resin Composition]

About 5 mg of the epoxy resin composition as a sample was subjected to thermal analysis by means of differential scanning calorimetry (DSC: DSC-2920 manufactured by TA Instruments, Inc.) in a nitrogen atmosphere at a temperature rise rate of 10° C./minute from a temperature of 20° C. to 350° C. Measurement was carried out by setting as a reaction starting temperature a temperature of the intersection of the extended line of a rising of an exothermic peak and the base line.

[Minimum Viscosity of Epoxy Resin Composition]

For the resultant epoxy resin composition as a sample, the lowest value of the complex viscosity was determined in dynamic viscoelasticity measurement with a strain of 1% at a frequency of 10 rad/second at a temperature rise rate of 2° C./minute between temperatures of 25° C. and 200° C.

[Tackiness of Prepreg]

A resin film was formed on an exfoliate paper using each of the resultant epoxy resin compositions, and the film was transferred to a carbon fiber flat-woven fabric (T-300-3K manufactured by Toray Industries Co., Ltd.) by applying heat and pressure so as to achieve a resin content of 41% by weight. As a result, prepregs were obtained.

Tackiness of prepregs immediately after fabrication and after exposure at room temperature for 10 days were evaluated by hand touching on a three-point scale described below.

Excellent: sufficient adhesiveness was sensed

Good: some adhesiveness was sensed

Poor: almost no adhesiveness was sensed

[Fracture Toughness of Cured Products]

The obtained epoxy resin compositions were individually cured for 2 hours at a temperature of 180° C. in a programmed oven to prepare cured resin products.

The cured resin products obtained as described above were respectively used to prepare test samples according to ASTM D5045-91, and a fracture toughness value (MPa·$\sqrt{m}$) at 23° C. (dry condition) was measured.

[Peel Strength of Honeycomb Panel]

Two obtained prepregs were laminated and this was placed on both the faces of a honey core (Nomex Honeycomb SAH-1/8-8.0 manufactured by Showa Aircraft Co., Ltd.) and then placed in a bag and was heated in an autoclave at a temperature of 180° C. for 2 hours (a temperature rise rate of 2.8° C./minute) and cured to fabricate a honeycomb panel. During the time, the inside of the autoclave was pressurized to 0.32 MPa by air pressure.

For the obtained honeycomb panels, the face sheets arranged the upper and lower sides of the honeycomb core in the heat curing process were each processed to a predetermined size, and peeling strength (lb-in/3 in) of test pieces of the upper-side face sheet and the lower-side face sheet at a temperature of 23° C. (dry condition) was measured according to ASTM D1781.

TABLE 1

|  |  |  | Example 1 | Example 2 | Example 3 | Comparative Example 1 | Comparative Example 2 |
|---|---|---|---|---|---|---|---|
| Epoxy resin | Resin A-1 | Parts by weight | 60 | 60 | 60 | 60 | 60 |
|  | Resin A-2 | Parts by weight | 40 | 40 | 40 | 40 | 40 |
| Amine curing agent | curing agent B | Parts by weight | 35 | 35 | 35 | 35 | 35 |
| Organic acid dihydrazide compound | Curing agent C-1 | Parts by weight | 5 | — | — | — | — |
|  | Curing agent C-2 | Parts by weight | — | 5 | — | — | — |
|  | Curing agent C-3 | Parts by weight | — | — | 5 | — | — |
|  | Curing agent C-4 | Parts by weight | — | — | — | 5 | — |
| Dicyandiamide | curing agent D | Parts by weight | — | — | — | — | 1.5 |
| Thermoplastic resin | Resin F | Parts by weight | 45 | 45 | 45 | 45 | 45 |
| Properties of resin composition | Amount of change in viscosity (75° C., 2 hours) Pa · s | | 36 | 30 | 42 | 80 | 76 |
|  | Reaction starting temperature ° C. | | 126 | 140 | 128 | 88 | 95 |
|  | Fracture toughness value MPa · $\sqrt{m}$ | | 2.0 | 2.1 | 2.0 | 2.0 | 2.0 |
|  | Tackiness of prepreg immediately after prepreg fabrication | | Excellent | Excellent | Excellent | Excellent | Excellent |
|  | Tackiness of prepreg after exposure at room temperature for 10 days | | Excellent | Excellent | Excellent | Poor | Poor |

The results of Table 1 show that the epoxy resin compositions of the present invention (Examples 1 to 3) have small amounts of change in viscosity at a temperature of 75° C. after 2 hours. In addition, the reaction starting temperature measured by DSC is shown to be high and the possibility of progress of curing reaction at a resin temperature (60 to 90° C.) during usual coating operation and during storage at normal temperature is shown to be low. In addition, the tackiness of the prepregs even after their exposure at room temperature for 10 days is shown to be hardly changed.

On the other hand, when dicyandiamide (Comparative Example 2) and an organic acid dihydrazide with a melting point of less than 150° C. (Comparative Example 1) are used, the amounts of change in viscosity at 75° C. in 2 hours are shown to be large and also the reaction starting temperatures are shown to be low. Furthermore, tackiness of the prepregs are also shown to be greatly decreased after exposure at room temperature for 10 days.

What is claimed is:

1. An epoxy resin composition for fiber-reinforced composite materials, comprising, 100 parts by weight of an epoxy resin (A), 25 to 50 parts by weight of an amine curing agent (B) selected from aliphatic polyamines, alicyclic polyamines and aromatic polyamines; and 1 to 20 parts by weight of an organic acid dihydrazide compound (C) of a melting point of between 185 and 200° C.; and a thermosetting resin (E) that is solid at room temperature does not completely dissolve in the epoxy resin (A) at a temperature of less than 90° C. and has a softening point of 120° C. or higher, wherein
the thermosetting resin (E) is dispersed in a particulate form in the epoxy resin composition;
wherein the composition further comprises a thermoplastic resin (F) and the thermoplastic resin (F) is in a particle state and is dissolved at a temperature of 90° C. or higher; and wherein the fracture toughness value measured in accordance with ASTM D5045-91 after curing of the epoxy resin composition is 1.8 MPa·$\sqrt{m}$ or higher.

TABLE 2

|  |  |  | Example 4 | Example 5 | Example 6 | Comparative Example 3 | Comparative Example 4 |
|---|---|---|---|---|---|---|---|
| Epoxy resin | Resin A-1 | Parts by weight | 60 | 60 | 60 | 60 | 60 |
|  | Resin A-2 | Parts by weight | 40 | 40 | 40 | 40 | 40 |
| Amine curing agent | curing agent B | Parts by weight | 35 | 35 | 35 | 35 | 35 |
| Organic acid dihydrazide compound | Curing agent C-2 | Parts by weight | 5 | 5 | — | — | — |
|  | Curing agent C-4 | Parts by weight | — | — | — | — | 5 |
|  | Curing agent C-5 | Parts by weight | — | — | 5 | — | — |
| Dicyandiamide | Curing agent D | Parts by weight | 2 | 2 | 2 | 2 | 2 |
| Thermosetting resin particles | Resin E | Parts by weight | — | 15 | 15 | 15 | 15 |
| Thermoplastic resin | Resin F | Parts by weight | 42 | 42 | 42 | 42 | 42 |
| Characteristics of resin composition | Amount of chance in viscosity (75° C., 2 hours) Pa · s | | 65 | 103 | 110 | 200 | 196 |
|  | Reaction starting temperature ° C. | | 135 | 135 | 125 | 95 | 88 |
|  | Minimum viscosity Pa · s | | 16 | 23 | 22 | 21 | 20 |
|  | Fracture toughness value MPa · $\sqrt{m}$ | | 1.8 | 2.4 | 2.4 | 2.0 | 2.0 |
|  | Tackiness of prepreg immediately after prepreg fabrication | | Excellent | Excellent | Excellent | Excellent | Excellent |
|  | Tackiness of prepreg after exposure at room temperature for 10 days | | Excellent | Excellent | Excellent | Good | Poor |
|  | Peeling strength of upper face sheet lb-in/3 in | | 19 | 25 | 26 | 25 | 23 |
|  | Peeling strength of lower face sheet lb-in/3 in | | 20 | 26 | 26 | 24 | 24 |

2. The epoxy resin composition for fiber-reinforced composite materials according to claim 1, comprising:
dicyandiamide (D), wherein
the organic acid dihydrazide compound (C) is dispersed in a particulate form.

3. The epoxy resin composition for fiber-reinforced composite materials according to claim 1, wherein
the organic acid dihydrazide compound (C) is any one of a dibasic acid dihydrazide and a carboxylic acid dihydrazide compound expressed by Formula (I):

wherein X represents a phenyl group or an aliphatic hydrocarbon group having 2 to 18 carbon atoms.

4. The epoxy resin composition for fiber-reinforced composite materials according to claim 1, wherein the average particle diameter of the organic acid dihydrazide compound (C) is 100 μm or less.

5. The epoxy resin composition for fiber-reinforced composite materials according to claim 1, wherein
the amine curing agent (B) is 3,3'-diaminodiphenylsulfone and/or 4,4'-diaminodiphenylsulfone.

6. The epoxy resin composition for fiber-reinforced composite materials according to claim 1, wherein the thermoplastic resin (F) is any one of a polyethersulfone resin and a polyetherimide resin.

7. The epoxy resin composition for fiber-reinforced composite materials according to claim 2, comprising 1 to 5 parts by weight of the dicyandiamide (D) with respect to 100 parts by weight of the epoxy resin (A).

8. The epoxy resin composition for fiber-reinforced composite materials according to claim 1, comprising 20 to 60 parts by weight of the thermoplastic resin (F) with respect to 100 parts by weight of the epoxy resin (A).

9. The epoxy resin composition for fiber-reinforced composite materials according to claim 1, wherein the minimum viscosity of the epoxy resin composition measured by dynamic viscoelasticity measurement at a temperature rise rate of 2° C./minute is from 10 to 150 Pa·s.

10. A method of producing an epoxy resin composition for fiber-reinforced composite material according to claim 1, comprising:
dissolving the thermoplastic resin (F) in the epoxy resin (A) at 95 to 150° C. to make a mixture resin,
cooling the mixture resin to 60 to 90° C., and then
adding other blending components including the amine curing agent (B) and the organic acid dihydrazide compound (C) into the mixture resin.

11. A fiber-reinforced prepreg, comprising the epoxy resin composition according to claim 1 as a matrix resin in complex with a reinforcing fiber.

12. The fiber-reinforced prepreg according to claim 11, wherein a content of the matrix resin is from 30 to 50% by weight.

13. The fiber-reinforced prepreg according claim 11, wherein the reinforcing fiber is carbon fiber.

14. A honeycomb sandwich panel, comprising the fiber-reinforced prepreg according to claim 11 and a honeycomb core that are laminated to each other.

15. The honeycomb sandwich panel according to claim 14, wherein the honeycomb core is any one selected from the group consisting of aramid honeycombs, aluminum honeycombs, paper honeycombs, and glass honeycombs.

* * * * *